D. E. ROSS.
STEERING GEAR.
APPLICATION FILED APR. 26, 1917.

1,429,101.

Patented Sept. 12, 1922.

Witness
Fenton S. Belt

Inventor
David E. Ross
By Alexander & Dowell
Attorneys

Patented Sept. 12, 1922.

1,429,101

UNITED STATES PATENT OFFICE.

DAVID E. ROSS, OF LAFAYETTE, INDIANA, ASSIGNOR TO ROSS GEAR AND TOOL COMPANY, OF LAFAYETTE, INDIANA, A CORPORATION OF INDIANA.

STEERING GEAR.

Application filed April 26, 1917. Serial No. 164,745.

*To all whom it may concern:*

Be it known that I, DAVID E. ROSS, a citizen of the United States, residing at Lafayette, in the county of Tippecanoe and State of Indiana, have invented certain new and useful Improvements in Steering Gears; and I hereby declare that the following is a full, clear, and exact description thereof, reference being had to the accompanying drawings, which form part of this specification.

This invention is a novel steering gear for automobilees and like vehicles and its object is to provide an improved gear by which motion from the steering wheel will be transmitted to the steering axle through a fluid intermediary, the parts being so constructed that power will be transmitted positively and quickly from the steering head to the axle; and there will be such amplification of power that the steering wheel may be as securely held as in the present known types of steering gears, and will require no more exertion on the part of the operator than is ordinarily required by the known gears.

I will explain the invention with reference to the accompanying drawings, which illustrate one embodiment thereof, and which, when understood, will enable others skilled in the art to adopt and use the same; and in the claims are summarized the essentials of the invention for which protection is desired.

The apparatus comprises a casing 1 which is provided with two intercommunicating gear chambers $1^a$, $1^b$, in which are fitted two rotary pump-gears 2 and $2^a$ which intermesh and together practically fill the chambers and prevent communication from one side of the gears to the other, except around the gears, as usual in fluid gear pumps.

Fluid can be admitted into the chamber at one side of the gears 2, $2^a$ through a port 4 and be exhausted at the other side of the gear through a port $4^b$. These gears should be so fitted in the casing that practically no oil or fluid can leak through the casing under pressure.

Figure 1:
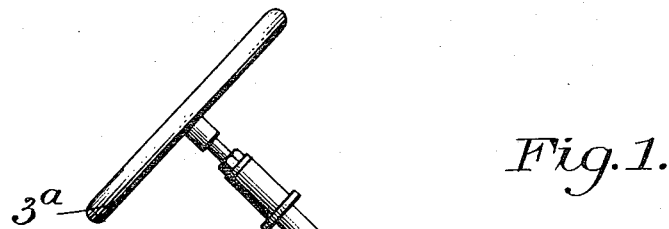
Figure 1 is an elevation of the complete steering gear.
Figure 2:
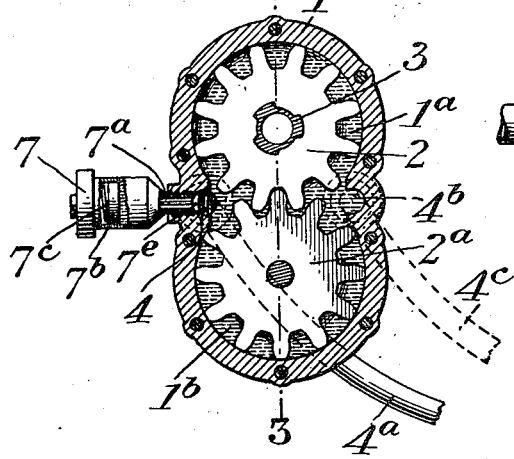
Figure 2 is an enlarged section on the line 2—2 Fig. 1.
Figure 3:
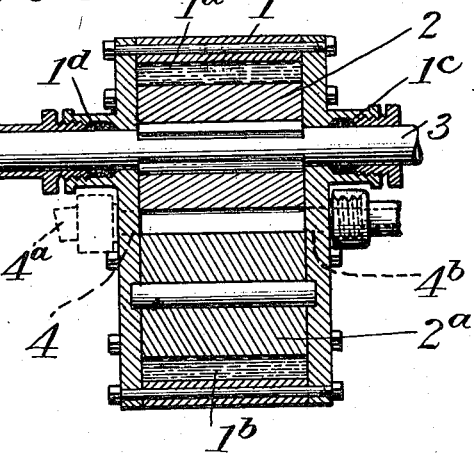
Figure 3 is a section on the line 3—3 Fig. 2.

Extending axially through chamber $1^a$ is a tubular steering shaft 3 to which the gear 2 is splined or otherwise fitted so that said gear must turn with the said shaft. The steering shaft 3 may be provided with a hand wheel $3^a$ as usual. The particular construction of this steering shaft does not form any part of the present invention; and it is only conventionally illustrated in the drawing. Leakage of fluid out of the casing at the points where the shaft 3 is journaled therein may be prevented by suitable stuffing boxes indicated at $1^c$, $1^d$ in Fig. 3 or other suitable means.

Figure 4:
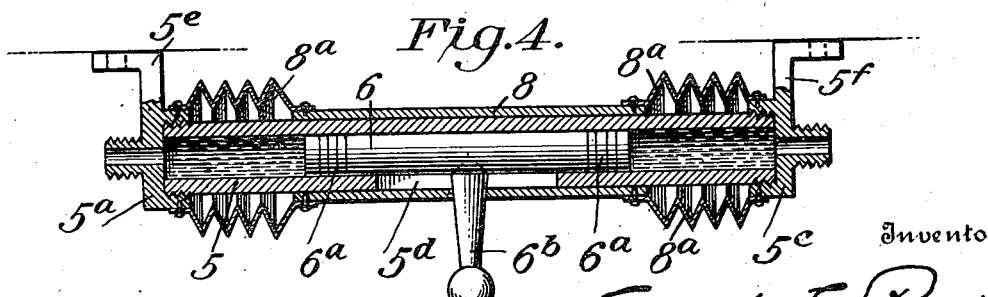
Figure 4 is an enlarged detail section on the line 4—4, Fig. 1.

The port 4 is connected by a pipe $4^a$ with one end of a cylinder 5, and the port $4^b$ is connected by a pipe $4^c$ with the other end of said cylinder. This cylinder 5 may be of any suitable construction. As shown in Fig. 4 it may be formed of a cylindric body closed by screw caps $5^a$, $5^c$ which may be provided with bracket-arms $5^e$, $5^f$ by which the cylinder may be fastened to a suitable support on, or member of, the chassis of the vehicle in which the steering gear is used.

Within the cylinder 5 is a piston 6 which may be suitably packed as indicated at $6^a$ to make it fluid tight, and to this piston is attached a steering finger $6^b$ which projects through a slot $5^d$ in the side of the cylinder 5. The steering finger and slot limit the possible extent of linear movement of the piston in the cylinder. As fluid is admitted into one end of the cylinder to move the piston in one direction, such movement of the piston will expel a like quantity of liquid from the opposite end of the cylinder.

As the pump and piston are in direct communication it will be seen that if the gear 2 be turned clockwise fluid will be expelled through the port $4^b$ and pipe $4^c$ into the right hand end of the cylinder 5 and drive piston 6 to the left; if the parts are connected as shown in the drawing; and at the same time a like quantity of fluid will be expelled from the left hand end of the cylinder 5 through pipe $4^a$ and port 4 into the casing.

The parts should be so proportioned that the amount of fluid necessary to be displaced in order to move the piston 6 a certain distance, would require a predetermined extent of rotary movement of the hand wheel 3ª, and pump gear 2; and by properly proportioning the size and teeth of the said gears and the diameter of the bore of the cylinder 5 relative to the length of stroke which must be imparted to the steering finger 6ᵇ, it will be possible to so augment the power transmitted from the wheel 3ª to the piston 6, through the fluid medium, that the finger 6ᵇ to which the steering links are connected will be moved and held with the necessary power and positiveness to enable the vehicle to be controlled safely and easily from the steering wheel.

The drawings do not illustrate the relative proportions of parts but those skilled in the art will readily determine their arrangement and proportions to give the desired augmentation of power, or reduction of speed, between the wheel 3ª and the piston 6.

It will be observed that there is a direct circuit of fluid from the pump-chamber to the cylinder at one side, and from the cylinder to the pump-chamber at the other side; the pump casing, the pipes, ports and cylinder should be kept constantly filled with heavy fluid so that any movement imparted to the gear 2 will be immediately correspondingly transmitted with the proper augmentation of power to the piston 6.

The pump chambers may be kept full of oil and any possible leakage compensated for by any suitable means.

As shown an oil cup 7 may be connected with the casing at a suitable point to supply oil to the pump chamber adjacent the port 4; the oil in said cup may be expelled therefrom into the casing through a duct 7ª by means of a plunger 7ᵇ in the casing, pressed inward by a spring 7ᶜ in the usual manner. A suitable check valve 7ᵉ may be placed at the outlet of the oil cup adjacent the port 4 to prevent any back pressure of fluid into the cup from the pump chambers.

The casing 1 may be supported in any suitable manner, being conventionally illustrated as supported by a bracket 1ᵒ upon that part of the chasis to which the cylinder 5 is attached.

To exclude any dust which might enter through the slot 5ᵈ, the cylinder may be surrounded by a sleeve 8 slidably mounted on the cylinder and having an opening in one side for the passage of the finger 6ᵇ, but moving with said finger and the piston 6.

If desired flexible accordion-plaited dust excluders 8ª may be connected to the ends of the sleeve 8 and the caps 5ª, 5ᶜ as indicated in Fig. 4 to prevent any dust getting between the sleeve and the exterior of the cylinder.

What I claim is:

1. In a fluid controlled steering gear, a cylinder having a longitudinal slot; a piston in said cylinder closing said slot; a sleeve slidably mounted on the cylinder and covering the slot therein and movable with the piston to exclude dust from the interior of the cylinder; means connected with said piston and extending through the slot in the cylinder and the sleeve and adapted to be connected with the steering members of a vehicle; manually operable means for forcing fluid; and means for conducting fluid from said operable means to and from the cylinder at opposite ends of the piston.

2. In a fluid controlled steering gear, a cylinder having a longitudinal slot; a piston in said cylinder closing said slot; a sleeve slidably mounted on the cylinder and covering the slot therein and movable with the piston to exclude dust from the interior of the cylinder; and means connected with said piston and extending through the slot in the side of the cylinder and through the sleeve and adapted to be connected with the steering members of a vehicle; and flexible protectors connecting the ends of said sleeve with the adjacent ends of the cylinder.

3. In a steering gear the combination of a pump chamber having opposite ports; intermeshing rotary pump gears in said chamber; a manually operable steering wheel shaft operatively connected with one of the pump gears and extending axially thereof out of the casing; a cylinder having a longitudinal slot; a piston in the cylinder; a sleeve surrounding the slotted part of the cylinder; a member connected with the piston and projecting out of the cylinder through the slot and sleeve and adapted to be connected with the steering member of a vehicle; and fluid conduits connected with the cylinder adjacent opposite ends of the piston therein and with opposite ports of the pump chamber, substantially as described.

In testimony that I claim the foregoing as my own, I affix my signature.

DAVID E. ROSS.